A. HECKMAN.
Corn-Planter.
No. 203,149.  Patented April 30, 1878.
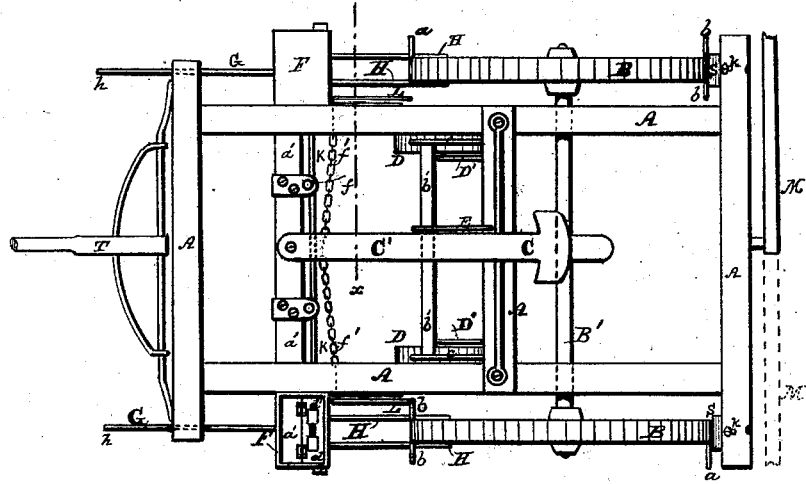
Fig: 1.
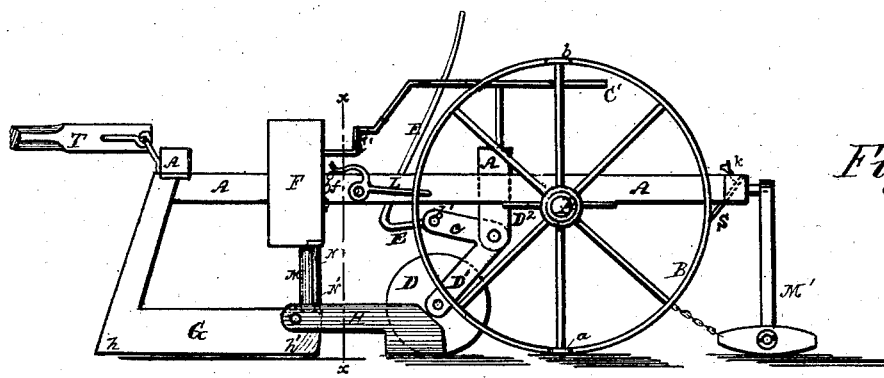
Fig: 2.
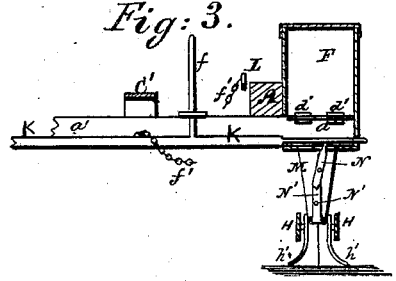
Fig: 3.
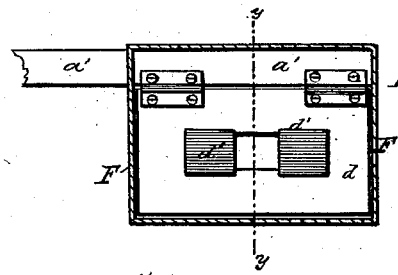
Fig: 4.
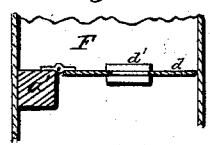
Fig: 5.
WITNESSES
S. P. Goodwin
H. A. Daniels.
INVENTOR
Adam Heckman
By W. Burris
ATTORNEY

UNITED STATES PATENT OFFICE.

ADAM HECKMAN, OF STERLING, ILLINOIS.

IMPROVEMENT IN CORN-PLANTERS.

Specification forming part of Letters Patent No. 203,149, dated April 30, 1878; application filed August 6, 1877.

*To all whom it may concern:*

Be it known that I, ADAM HECKMAN, of Sterling, in the county of Whitesides and State of Illinois, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a plan view. Fig. 2 is a side elevation. Fig. 3 is a transverse section on line $x$ of Figs. 1 and 2. Fig. 4 is a plan view of one of the grain-boxes, enlarged, showing the hinged plate. Fig. 5 is a transverse section on line $y\ y$, Fig. 4.

My invention relates to wheel corn-planters; and consists of the devices for operating the planter, as hereinafter described.

A is the frame of the machine. B B are the wheels, of the required diameter, for carrying the machine when the planter is in operation. These wheels are rigidly attached to a revolving axle, B', having its bearings attached to the frame, and are provided with single lugs $a$ and double lugs $b$ on the rim of the wheels, arranged half of the circumference of the wheels apart. The single lug on one wheel is opposite the double lug on the other wheel, for operating the dropping devices and for marking the cross-rows.

C represents the driver's seat, which may be adjusted on the bar C', so as to be moved backward and forward, to properly balance the weight of the driver.

D D are wheels for carrying the machine when the planting devices are not in operation. These wheels have their bearings in the arms $D^1$, which are pivoted to the plates $D^2$, attached to the frame, and are provided with arms $c$, to the ends of which is attached a bar, $b'$, to which bar is attached a lever, E, for lowering and raising the wheels D.

F F are grain-boxes, provided with plates $d$, hinged to the cross-bar $a'$ of the frame, and provided with rubber bearings or brushes $d'$, to aid the feeding of the grain.

G G are plows, having long points or cutting-plates $h$, and double molds $h'$, for opening the furrows for the grain. H represents coverers attached to the rear of the plows, to scrape the earth into the furrows, over the grain, before the wheels, which, following, press the earth in the furrows on the grain.

K is a feed-bar, extending through both grain-boxes, and is provided with a hand-lever, $f$, and chain $f'$, connected at the ends to the levers L L, pivoted to the sides of the frame, and adjusted to engage the lugs $b$ on the wheels B, for operating the dropping devices.

M M are spouts, provided with double channels, for conveying the grain from the feed-boxes to the furrows. N N are levers, pivoted to the spouts, connected at the upper ends to the feed-bar, and at the lower ends to the levers N' N', which are pivoted to the spouts, and bent at the lower ends and extended under the lower ends of the spouts, to open and close them, as required, in dropping the corn.

M' is an adjustable marker, having pivotal connection with the rear part of the frame, and provided with a block on the end, attached by a swivel-joint, to adjust it for marking rows on either side of the machine.

S represents scrapers, adjustable by means of set-screws $k$, for keeping the wheels clear of dirt.

The tongue T is attached by any convenient couplings which will allow free vertical motion of the machine, that it may conform to the unevenness of the surface of the ground.

When the planting devices are not required to be in operation, the lever E is moved forward, lowering the wheels D, raising and carrying the machine on these wheels; and in starting in at the end of the rows, or at any point, when necessary to adjust the wheels B so that the cross-rows will come in line, the driver stops the machine and raises the wheels B clear of the ground, and turns them till the lugs will range with the marks on the previous rows. Each movement of the feed-bar conveys the proper number of grains into one channel of each spout, which channels are closed at the bottom by the valve on the lower ends of the levers N'. The grain in these channels is carried at the bottom of the spouts to the next hill or cross-row, when the reverse movement of the feed-bar opens the bottoms of these channels, depositing the grain in the hills, and closes the other channels and conveys into them the grain, to be in like manner deposited at the next hills. A sufficient opening is left in the back of the spouts to allow the driver to see the grain as it passes from the boxes into the spouts, to detect and correct any irregularity in the dropping devices.

When, for any reason, the dropping cannot be effected by the lugs on the wheels, the feed-bar may be operated by hand by means of the hand-lever $f$.

What I claim as new, and desire to secure by Letters Patent, is—

1. A corn-planter having the single lugs $a$ and double lugs $b$ alternately arranged on the rim of the wheels B B, in combination with the levers L, connected to the feed-bar K, substantially as and for the purposes described.

2. The hinged plates $d$, having rubber bearings or brushes $d'$, substantially as and for the purposes described.

In testimony that I claim the foregoing as my own invention I affix my signature hereunto in presence of two witnesses.

ADAM HECKMAN.

Witnesses:
WM. W. SANBORN,
A. H. PADDOCK.